US008745237B2

(12) United States Patent
Tsirkin et al.

(10) Patent No.: US 8,745,237 B2
(45) Date of Patent: Jun. 3, 2014

(54) MAPPING OF QUEUES FOR VIRTUAL MACHINES

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 368 days.

(21) Appl. No.: 13/278,526

(22) Filed: Oct. 21, 2011

(65) Prior Publication Data

US 2013/0104124 A1    Apr. 25, 2013

(51) Int. Cl.
G06F 9/455    (2006.01)
G06F 9/46    (2006.01)
G06F 15/173    (2006.01)

(52) U.S. Cl.
USPC ............................... 709/226; 718/1; 718/105

(58) Field of Classification Search
USPC ...................................... 709/226; 718/1, 105
See application file for complete search history.

(56) References Cited

U.S. PATENT DOCUMENTS

| | | | | |
|---|---|---|---|---|
| 7,257,811 | B2 * | 8/2007 | Hunt et al. ......................... | 718/1 |
| 7,643,477 | B2 * | 1/2010 | Spink et al. .................. | 370/381 |
| 8,149,708 | B2 * | 4/2012 | Oz et al. ........................ | 370/235 |
| 8,214,559 | B2 * | 7/2012 | Moriki et al. .................. | 710/40 |
| 8,266,633 | B1 * | 9/2012 | Saulsbury et al. ............. | 719/314 |
| 2003/0223442 | A1 * | 12/2003 | Huang et al. .................. | 370/412 |
| 2006/0143389 | A1 * | 6/2006 | Kilian et al. .................. | 711/130 |
| 2012/0102501 | A1 * | 4/2012 | Waddington et al. ......... | 718/105 |
| 2013/0089106 | A1 * | 4/2013 | Tsirkin et al. ................. | 370/412 |

* cited by examiner

Primary Examiner — Larry Donaghue
(74) Attorney, Agent, or Firm — Lowenstein Sandler LLP (57) ABSTRACT

A method and system for managing multiple queues of a networking device associated with a host machine in a virtual machine system. The networking device includes multiple dedicated queues and shared queues that are used by multiple guests of the virtual machine system for the transmission and/or receipt of packets in a data communication. A hypervisor of the virtual machine system manages the assignment of the multiple queues to the multiple guests by dynamically mapping addresses of the virtual machines based on determination of a load placed on the queues.

24 Claims, 5 Drawing Sheets

| Queue Assignment Table | | |
|---|---|---|
| Queue Identifier | Virtual Machine Address assigned to the Queue | Load Value (during selected time period) |
| DQ1 | Address1 | Load (Address1) |
| DQ2 | Address2 | Load (Address2) |
| ... | ... | ... |
| DQN | AddressN | Load (AddressN) |
| SQ1 | Address1s | Load (Address1s) |
| SQ2 | Address2s | Load (Address1s) |
| ... | ... | ... |
| SQN | AddressNs | Load (AddressNs) |

| Load Ranking Table | | |
|---|---|---|
| Queue Identifier | Load Value (from highest to lowest) | Virtual Machine Address |
| DQ6 | Highest Value | Address12 |
| SQ4 | 2nd Highest Value | Address3, Address7 |
| SQ3 | 3rd Highest Value | Address4, Address11 |
| .... | .... | .... |
| DQ1 | Lowest | Address1 |

FIGURE 5

MAPPING OF QUEUES FOR VIRTUAL MACHINES

TECHNICAL FIELD

Embodiments of the present invention relate to a computer system, and more specifically, to network device management in a virtual machine system.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

One such resource managed by the host computer is a networking device (e.g., a hardware network interface controller (NIC)) that may be used by multiple guests (i.e., virtual machines) operating at the same time. Each guest or virtual machine is assigned a different and unique network address, such as a virtual LAN (VLAN) tag and/or a media access control (MAC) address, or some other combination of data in a packet header. The networking device has multiple queues for managing incoming packets to be received by a virtual machine and outgoing packets transmitted by a virtual machine. Dedicated queues may be used which are mapped to a specific hardware address and dedicated to a specific virtual machine. Typically, a hardware NIC has fewer dedicated queues than the number of virtual machines, thus each virtual machine can not be assigned to a dedicated queue. Accordingly, shared queues are employed which are shared by multiple virtual machines. However, the management of the multiple dedicated and shared queues of the virtual machine system creates a significant administrative burden for the host computer administrator including the continual monitoring, evaluating and re-allocating of the queues based on the frequently changing queue activity.

When a packet is received in a shared queue, the host computer needs to look at the received packet in order to determine which guest (virtual machine) should receive the packet. As such, the packet can not be placed directly into a memory of the guest virtual machine for which it is intended. Instead, the host computer must make a copy of the packet, thereby expending additional computational and storage resources.

When a packet to be transmitted is placed in a shared queue, the host computer must examine the packet in order to validate the address. This can cause contention between multiple virtual machines seeking to utilize the same shared queue and creates a bottleneck negatively effecting network performance.

DETAILED DESCRIPTION

Methods and systems for managing multiple queues of a networking device of a host machine in a virtual machine system. The networking device includes multiple dedicated queues and shared queues that are used by multiple guests of the virtual machine system for the transmission and/or receipt of packets in a data communication. A hypervisor of the virtual machine system manages the assignment of the queues to the guests by dynamically mapping addresses of the virtual machines to the queues, without interrupting or stopping the normal packet processing.

In an embodiment, the hypervisor monitors a load placed by a virtual machine address on each of the dedicate queues and shared queues of the virtual machine system. As used herein, the "load" represents the amount of work performed by a queue. For example, the load may be measured in terms of a number of packets in the queue or a total size of the packets in the queue. A "dedicated queue" is a queue that is mapped to a hardware address and dedicated to a specific virtual machine. A "shared queue" is a queue that is used by multiple virtual machines to transmit and/or receive packets in a data communication. The hypervisor ranks the determined loads associated with each virtual machine address, from highest to lowest. For each virtual machine address in the ranking, starting with the address having the highest load, the hypervisor determines whether the virtual machine address (also referred to as the "subject virtual machine address") is assigned to a dedicated queue. If so, the hypervisor maintains the assignment of the virtual machine address to the dedicated queue. If not (i.e., the subject virtual machine address is assigned to a shared queue), the hypervisor identifies a dedicated queue having the lowest load (herein "a minimum load dedicated queue").

In an embodiment, a hardware component of the system may estimate a load placed by a virtual machine address on a shared queue by dividing the total load on the shared queue by the number of virtual machine addresses using the shared queue. Advantageously, this estimation approach may be utilized if the system is able to determine the total load on the shared queue, but not the exact load applied by each virtual machine address.

The hypervisor determines a difference between the load placed by the subject virtual machine address and the load on the minimum load dedicated queue (herein the "load difference"). In an embodiment, the load difference is a function that decreases as the load on the minimum load dedicated queue increases and the load of the subject virtual machine address decreases. The load difference is compared to a threshold value, and if it is greater than the threshold value, the hypervisor re-assigns the virtual machine address to the minimum load dedicated queue.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that optimizes the utilization of the dedicated queues and the shared queues of a virtual machine system. The mapping of virtual machine addresses provides for a virtual machine system wherein the dynamic re-allocation of the multiple queues among the multiple virtual machine addresses is realized. Advantageously, the method and system according to embodiments of the invention provide for dynamic management of multiple dedicated and shared queues to avoid the need for an administrator to continuously track and manage the utilization of the queues.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
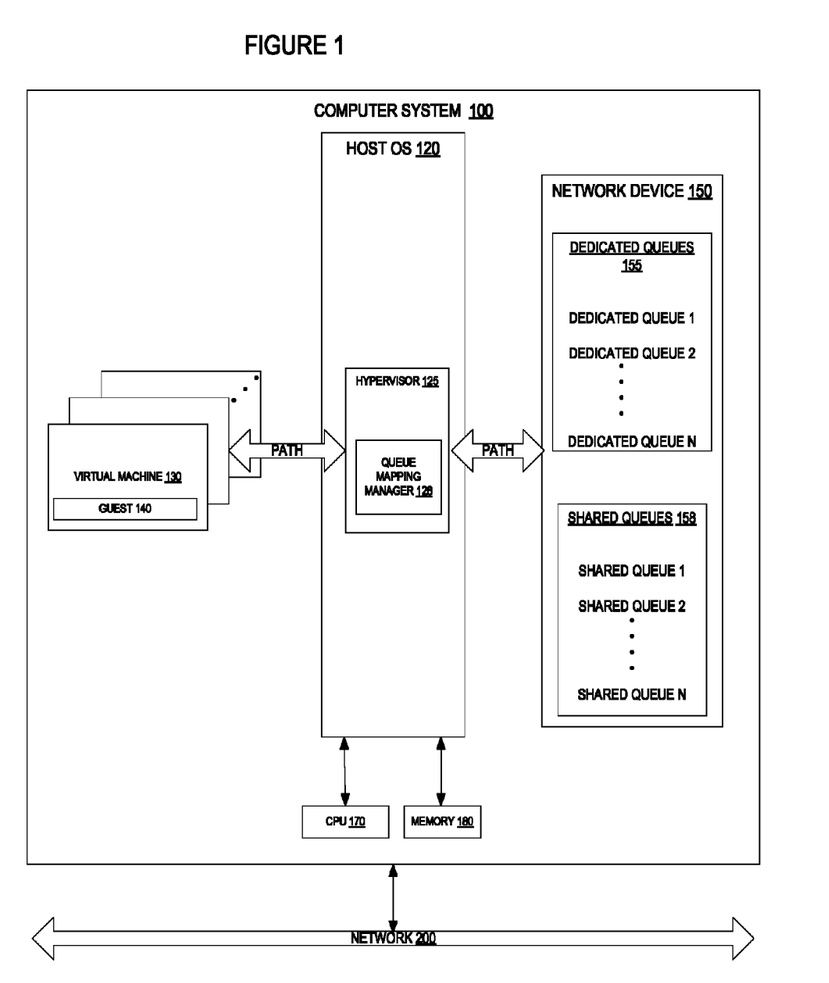
FIG. 1 is a block diagram of a virtual machine system that hosts multiple guests, according to one embodiment of the invention.

FIG. 1 is a block diagram that illustrates an embodiment of a computer system 100 in which embodiments of the present invention may operate. The computer system 100 hosts multiple virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware, making the use of the virtual machine 130 transparent to the guest 140 and the users of the computer system 100. In one embodiment, the hypervisor 125 may support multiple virtual machines 130. In one embodiment, the hypervisor 125 is part of a host operating system (OS) 120.

In one embodiment, the computer system 100 is accessible by remote systems via a network 200. The network 200 may be a private network (e.g., a local area network (LAN), a wide area network (WAN), intranet, etc.) or a public network (e.g., the Internet).

The computer system 100 also includes hardware components such as one or more physical central processing units (CPUs) 170, memory 180, and other hardware components. In one embodiment, the computer system 100 also includes a network device 150 communicatively coupled to the guest 140 via communication paths managed by the queue mapping manager 128. During operation, each guest 140 interacts with the host OS 120 via a virtual machine 130 having a specific network address (herein the "virtual machine address"). The virtual machine address may be any suitable protocol or format, including a virtual LAN (VLAN) tag and/or a media access control (MAC) address. Each virtual machine address is assigned to one of multiple dedicated queues 155 (i.e., dedicated queue 1 (DQ1), dedicated queue 2 (DQ2), . . . dedicated queue N (DQN)) and/or one or more of multiple shared queues 158 (i.e., shared queue 1 (SQ1), shared queue 2 (SQ2), . . . shared queue N (SQN) maintained by the network device 150.

According to one embodiment of the present invention, the hypervisor 125 includes a queue mapping manager 128 to manage the mapping or assignment of the queues to the one or more quests 140. Periodically, the queue mapping manager 128 determines the load placed on the queues 155, 158 of the network device 150 at selected time interval. One having ordinary skill in the art will appreciate that the queue mapping manager 128 may be configured to determine the queue loads during any suitable time interval, such as, for example, determining the queue loads every 10 milliseconds or 20 milliseconds. Based on the collected load information, the queue mapping manager 128 can re-assign a virtual machine 130 to a different queue according to the methodology described in detail below in connection with FIG. 4.

Figure 2:
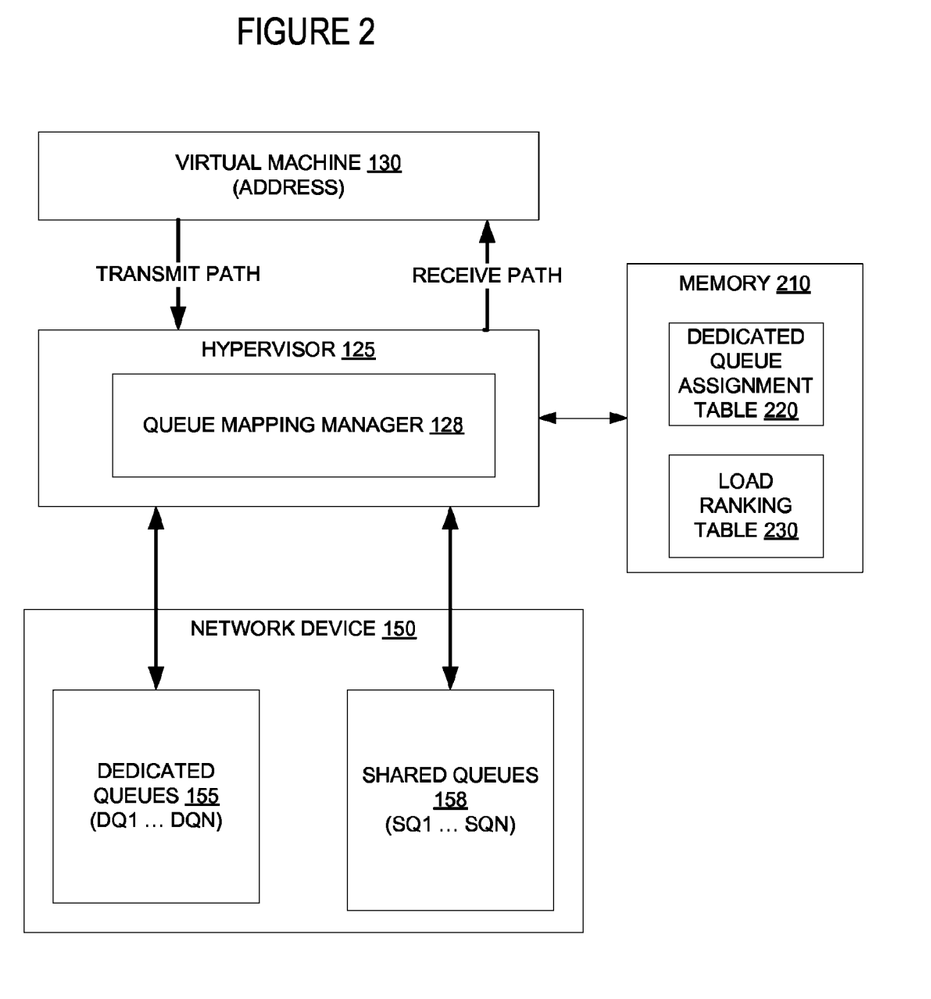
FIG. 2 is a block diagram of a hypervisor, a network device, and a virtual machine in a virtual machine system, according to one embodiment of the invention.

FIG. 2 is a block diagram of an exemplary hypervisor 125, a network device 150, and a virtual machine 130 in a virtual machine system, according to one embodiment of the invention. As shown in FIG. 2, the hypervisor 125 includes a queue mapping manager 128 configured to manage the assignment of the queues to the guests by dynamically mapping addresses of the virtual machines to the queues, according to the exemplary process flow described below in connection with FIG. 4. The queue mapping manager 128 is connected to a memory 210 associated with the hypervisor 125. The memory 210 is configured to store a queue assignment table 220 and a load ranking table 230, examples of which are shown in FIG. 3.

Figure 3:
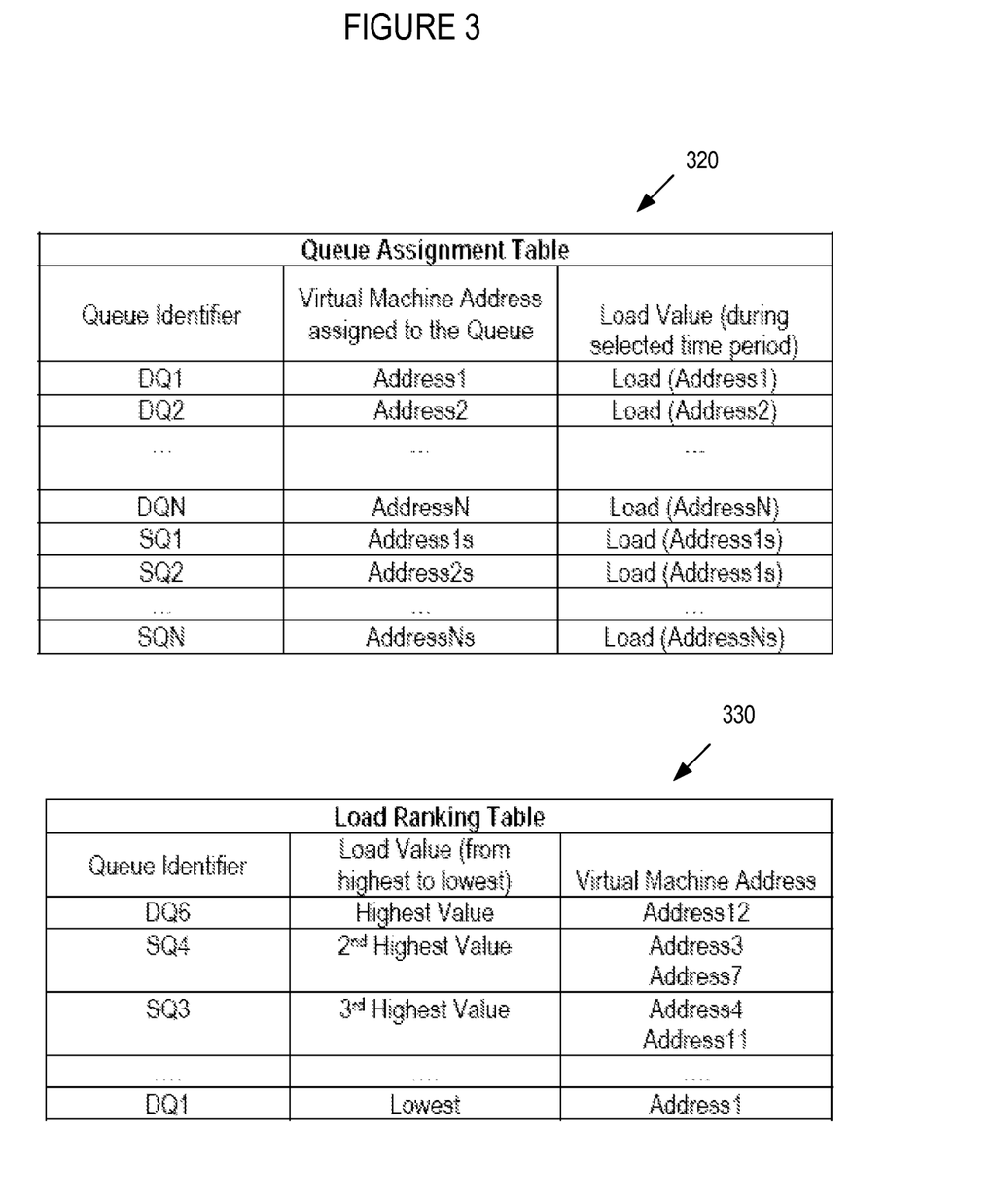
FIG. 3 illustrates exemplary queue data managed by a queue mapping manager.

FIG. 3 illustrates exemplary queue data managed by the queue mapping manager 128. As shown in FIG. 3, the queue assignment table 220 includes a listing of the dedicated queues 155, the corresponding virtual machine address assigned to each dedicated queue 155, and a load placed on each dedicated queue 155 periodically at a selected time interval (e.g., a 10 millisecond period).

In an embodiment, the load ranking table 230 includes a ranked listing of each of the dedicated queues 155 and shared queues 158 of the network device 150 (as denoted by a queue identifier), a load value placed on each of the queues (as determined at the selected time interval), and the one or more virtual machine addresses assigned to each of the queues. One having ordinary skill in the art will appreciate that the queue assignment table 220 and the load ranking table 230 may include additional information relating to the queues, the queue assignments, the queue loads, the virtual machines, and the like that may be monitored and tracked by the queue mapping manager 128. In an embodiment, a hardware component of the computer system 100 may estimate a load placed by each virtual machine address on a shared queue 158 by dividing the total load on the shared queue 158 by the number of virtual machine addresses using the shared queue.

Figure 4:
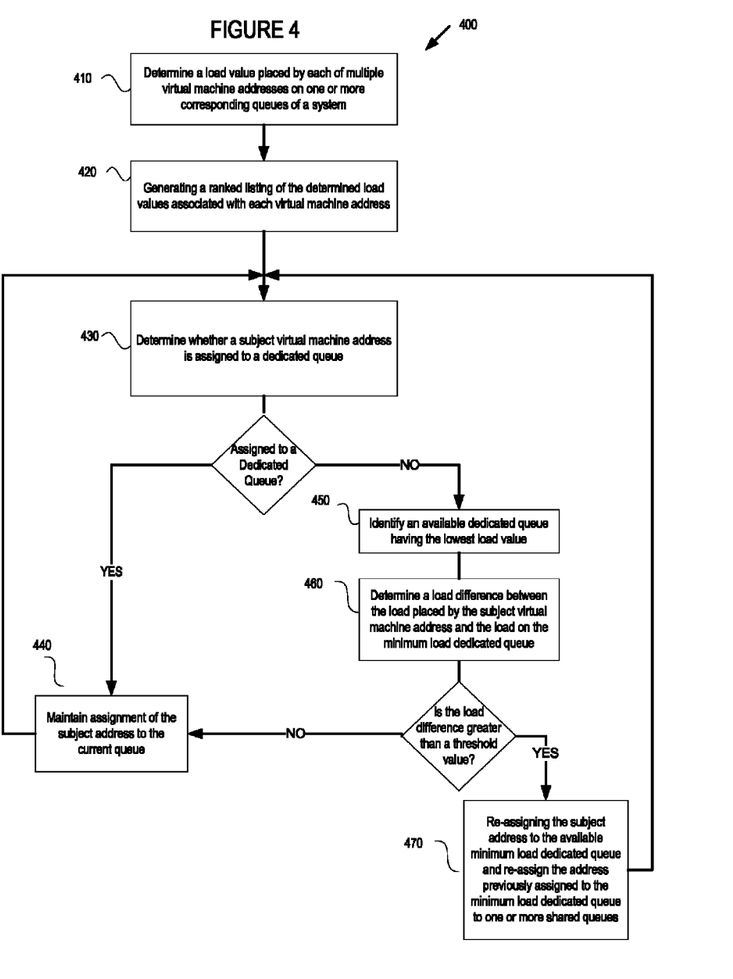
FIG. 4 is a flow diagram of one embodiment of a method for mapping queues in a virtual machine system.

FIG. 4 is a flow diagram illustrating one embodiment of a method 400 for dynamically mapping multiple queues of a network device to multiple virtual machines. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the queue mapping manager 128 of the hypervisor 125 of FIG. 1 and FIG. 2.

Referring to FIG. 4, in one embodiment, the method 400 begins when the queue mapping manager 128 determines a load (or load value) placed by a virtual machine address on multiple dedicated queues (e.g., dedicated queues 155 shown in FIG. 1) and a load value placed by one or more virtual machine addresses on multiple shared queues (e.g., shared queues 158 shown in FIG. 1) of a network device handling communication paths associated with multiple virtual machines, in block 410.

In an embodiment, the queue mapping manager 128 conducts the load value determination for a selected period of time, such as for example, a 10 millisecond time interval. The queue mapping manager 128 stores the determined load values in a memory associated with the hypervisor (e.g., memory 210 in FIG. 2). In an embodiment, the determined load values may be stored in tabular form, such as, for example, in the queue assignment table 320 shown in FIG. 3. As illustrated in this example, for each dedicated queue (DQ1-DQN), the queue mapping manager 128 identifies the virtual machine address assigned to the dedicated queue and the load value placed by the address on the dedicated queue during the selected time interval.

In block 420, the queue mapping manager 128 generates a ranked listing of the determine load values associated with each virtual machine address. In an embodiment, the load values are ranked in descending order, with the highest load value ranked at the top of the list. In an embodiment, the determined load values may be stored in tabular form, such as, for example, in the load ranking table 330 shown in FIG. 3. In the example shown in the load ranking table 330 of FIG. 3, at the selected time interval, it was determined by the queue mapping manager 128 that queue DQ6 has the highest load value and is assigned to the virtual machine address identified as Address12, and that queue DQ1 has the lowest load value and is assigned to the virtual machine address identified as Address1.

In block 430, for a virtual machine address in the ranked listing, the queue mapping manager determines whether the virtual machine address is assigned to a dedicated queue. Optionally, the determination in block 430 may be performed for each virtual machine address in the ranked listing. In an embodiment, the determination may be performed in descending order, starting with a subject virtual machine address in the ranked listing having the highest load value. If the subject virtual machine address (i.e., the address being reviewed by the queue mapping manager) is assigned to the dedicated queue, then the method 400 continues to block 440 and the queue mapping manager maintains the current assignment of the subject virtual machine address to the dedicated queue. In the example shown in FIG. 3, in block 430, the queue mapping manager 128 determines that Address12 has the highest load value and is assigned to a dedicated queue (DQ6), and as such, maintains the assignment of Address12 to DQ6.

If, at block 430, the queue mapping manager determines that the subject virtual machine address is not assigned to a dedicated queue (i.e., the address is assigned to a shared queue), the method 400 continues to block 450. In block 450, the queue mapping manager 128 identifies an available dedicated queue having the lowest load value (i.e., the minimum load dedicated queue). A minimum load dedicated queue is deemed available if it has not been re-assigned or re-mapped to a new virtual machine address by the queue mapping manager 128 as part of the method 400. In the example shown in FIG. 3, when the subject virtual machine address is Address3, the queue mapping manager 128 determines that the address is assigned to a shared queue (SQ4) and determines the dedicated queue having the lowest load value (i.e., DQ1). In embodiments, the queue mapping manager may determine the dedicated queue having the minimum load by looking up the respective load values of the dedicated queues in either the queue assignment table or the load ranking table.

In block 460, the queue mapping manager 128 determines a load difference between the load placed by the subject virtual machine address (which is presently assigned to a shared queue) and the load on the minimum load dedicated queue. The load difference may be any function that decreases as the load on the minimum load dedicated queue increases and the load of the subject virtual machine address decreases. For example, the load difference may be represented by one of the following exemplary equations:

Load Difference=Load(Subject Address)−Load(Minimum Load Dedicated Queue)

Load Difference=Load(Subject Address)/Load(Minimum Load Dedicated Queue)

If the load difference is less than a threshold value, then the method 400 continues to block 440 and the current assignment of the subject virtual machine address is maintained. In this instance, the method 400 ends since the subject address having the highest load in the ranking has a load value which is within the threshold value range of the next available minimum load dedicated queue (i.e., the load difference is less than the threshold value), and as such, no further re-assignments are deemed necessary.

If the load difference is greater than the threshold value, then the method 400 continues to block 470 and the queue mapping manager 128 re-assigns the subject address to the minimum load dedicated queue. Accordingly, the subject address previously assigned to a shared queue is dynamically mapped to a dedicated queue through the re-assignment by the queue mapping manager. Furthermore, in block 470, the virtual machine address previously assigned to the minimum load dedicated queue is re-assigned to one or more shared queues. Advantageously, the dynamic mapping or re-assignment of the subject address to a minimum load dedicated queue provides for an optimized communication system wherein the virtual machine having the highest load is optimally allocated to a dedicated queue which is currently under-utilized (i.e., manages a minimum load). Likewise, the re-allocating of the virtual machine previously assigned to the minimum load dedicated queue to one or more shared queues further optimizes the load balancing by allocating the identified smaller load to a shared queue. One having ordinary skill in the art will appreciate that any method or technique for assigning an address to a shared queue may be employed, including, but not limited to, enabling multiple addresses in a hardware filer or enabling a promiscuous mode setting. As illustrated in FIG. 4, the method 400 is iterative and may be repeated following block 440 and/or block 470 for each address in the ranking.

Figure 5:
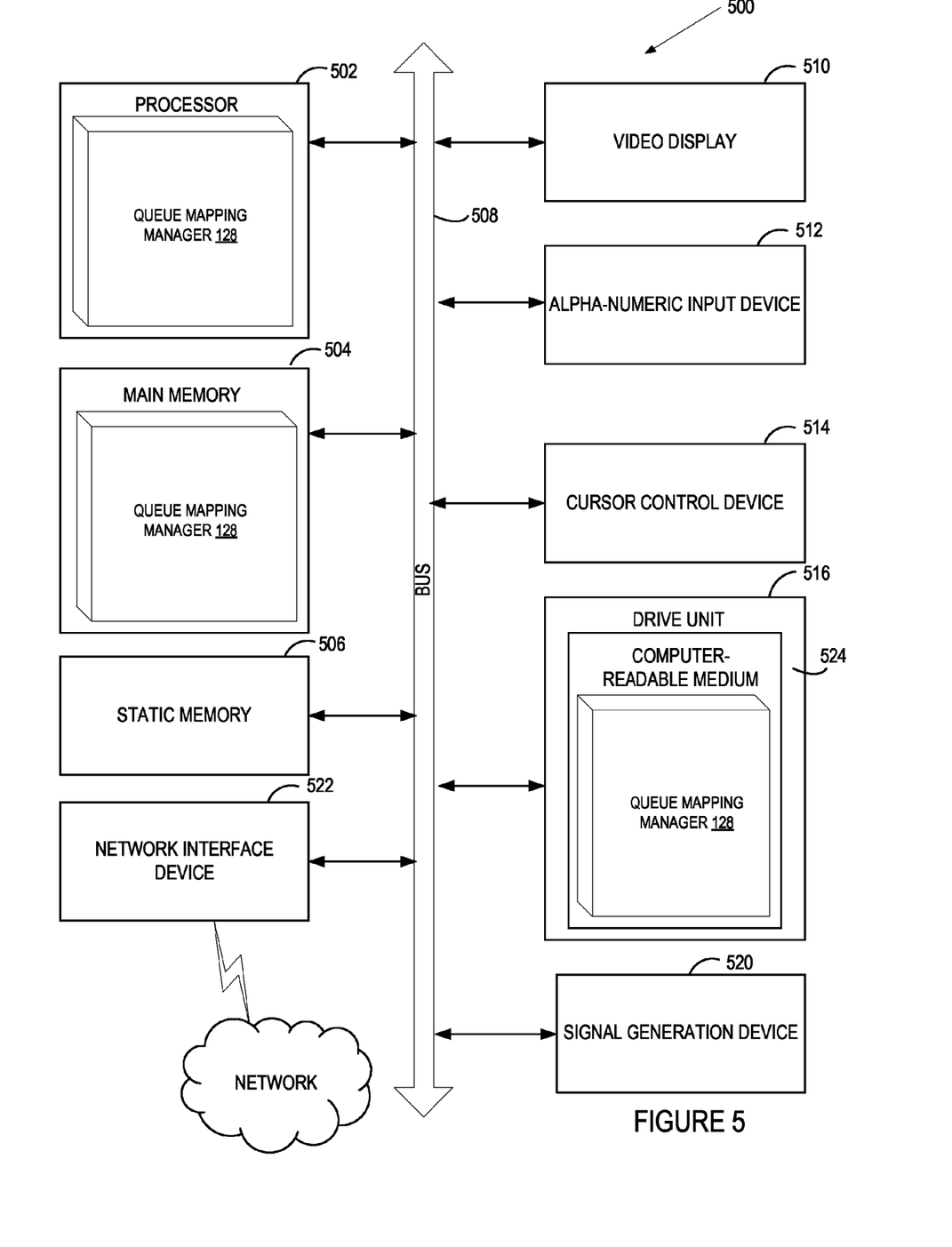
FIG. 5 illustrates a diagrammatic representation of an exemplary queue management system.

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The queue mapping manager 128 in FIG. 1 may comprise processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the queue mapping manager 128) embodying any one or more of the methodologies or functions described herein. The instructions of the queue mapping manager 128 may also reside, completely or at least partially, within the main memory 504 and/or within the processor 502 during execution thereof by the computer system 500, the main memory 504 and the processor 502 also constituting computer-readable media. The instructions of the queue mapping manager 128 may further be transmitted or received over a network via the network interface device 522.

While the computer-readable storage medium 524 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating", "identifying", "comparing", "re-assigning", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining a load value placed by each of a plurality of virtual machine addresses on one or more corresponding queues of a virtual machine system;
   generating a ranked listing of the determined load values associated with the plurality of virtual machine addresses;

identifying a subject virtual machine address on the ranked listing assigned to a shared queue;
identifying an available minimum load dedicated queue;
comparing a load value of the subject virtual machine address and a load value on the available minimum load dedicated queue to determine a load difference; and
re-assigning, by a processing device, the subject virtual machine address to the available minimum load dedicated queue when the load difference is greater than a threshold value.

2. The method of claim 1, wherein the subject virtual machine address is the virtual machine address having the highest load value on the ranked listing.

3. The method of claim 1 further comprising:
identifying a second subject virtual machine address on the ranked listing assigned to a shared queue;
identifying a next available minimum load dedicated queue;
comparing a load value of the second subject virtual machine address and a load value on the next available minimum load dedicated queue to determine a second load difference; and
re-assigning the second subject virtual machine address to the next available minimum load dedicated queue when the second load difference is greater than the threshold value.

4. The method of claim 3 further comprising:
identifying a further subject virtual machine address on the ranked listing assigned to a shared queue;
identifying another available minimum load dedicated queue;
comparing a load value of the further subject virtual machine address and a load value on the another available minimum load dedicated queue to determine an associated load difference; and
maintaining an assignment of the further subject virtual machine address to its corresponding shared queue when the load difference is less than or equal to the threshold value.

5. The method of claim 1 further comprising maintaining an assignment of the subject virtual machine address to its corresponding shared queue when the load difference is less than or equal to the threshold value.

6. The method of claim 1, wherein the subject virtual machine address has a highest load value on the ranked listing.

7. The method of claim 1 further comprising re-assigning a virtual machine address previously assigned to the minimum load dedicated queue to one or more shared queues.

8. The method of claim 1, wherein the load value placed by each of a plurality of virtual machine addresses on a corresponding dedicated queue of the virtual machine system is determined periodically at a selected time interval.

9. The method of claim 1, wherein the ranked listing of the determined load values associated with each virtual machine address is listed from a highest load value to a lowest load value.

10. The method of claim 1, further comprising:
determining a total load value on a shared queue; and
estimating the load value placed by each virtual machine address on the shared queue by dividing the total load value by a number of virtual machine addresses on the shared queue.

11. A non-transitory computer readable storage medium including instructions that, when executed by a processing system, cause the processing system to perform operations comprising:
determining a load value placed by each of a plurality of virtual machine addresses on a corresponding dedicated queue of the virtual machine system;
generating a ranked listing of the determined load values associated with each virtual machine address;
identifying a subject virtual machine address on the ranked listing assigned to a shared queue;
identifying an available minimum load dedicated queue;
comparing a load value of the subject virtual machine address and a load value on the available minimum load dedicated queue to determine a load difference; and
re-assigning the subject virtual machine address to the available minimum load dedicated queue when the load difference is greater than a threshold value.

12. The computer readable storage medium of claim 11, wherein the subject virtual machine address is the virtual machine address having the highest load value on the ranked listing.

13. The computer readable storage medium of claim 11 further comprising:
identifying a second subject virtual machine address on the ranked listing assigned to a shared queue;
identifying a next available minimum load dedicated queue;
comparing a load value of the second subject virtual machine address and a load value on the next available minimum load dedicated queue to determine a second load difference; and
re-assigning the second subject virtual machine address to the next available minimum load dedicated queue when the second load difference is greater than the threshold value.

14. The computer readable storage medium of claim 11 further comprising maintaining an assignment of the subject virtual machine address to its corresponding dedicated queue when the load difference is less than or equal to the threshold value.

15. The computer readable storage medium of claim 11, wherein the subject virtual machine address has a highest load value on the ranked listing.

16. The computer readable storage medium of claim 11 further comprising re-assigning a virtual machine address previously assigned to the minimum load dedicated queue to one or more shared queues.

17. The computer readable storage medium of claim 11, wherein the load value placed by each of a plurality of virtual machine addresses on a corresponding dedicated queue of the virtual machine system is determined periodically at a selected time interval.

18. A computer system comprising:
a memory;
a processing device, coupled to the memory; and
a hypervisor hosted by the computer system, having access to the memory and use of the processor, the hypervisor to:
determine a load value placed by each of a plurality of virtual machine addresses on a corresponding dedicated queue of the virtual machine system,
generate a ranked listing of the determined load values associated with each virtual machine address,
identify a subject virtual machine address on the ranked listing assigned to a shared queue,
identify an available minimum load dedicated queue,
compare a load value of the subject virtual machine address and a load value on the available minimum load dedicated queue to determine a load difference, and re-assign the subject virtual machine address to the available minimum load dedicated queue when the load difference is greater than a threshold value.

19. The computer system of claim 18, wherein the subject virtual machine address is the virtual machine address having the highest load value on the ranked listing.

20. The computer system of claim 18, the hypervisor to:
identify a second subject virtual machine address on the ranked listing assigned to a shared queue,
identify a next available minimum load dedicated queue,
compare a load value of the second subject virtual machine address and a load value on the next available minimum load dedicated queue to determine a second load difference, and
re-assign the second subject virtual machine address to the next available minimum load dedicated queue when the second load difference is greater than the threshold value.

21. The computer system of claim 18, the hypervisor to maintain an assignment of the subject virtual machine address to its corresponding dedicated queue when the load difference is less than or equal to a threshold value.

22. The computer system of claim 18, wherein the subject virtual machine address has a highest load value on the ranked listing.

23. The computer system of claim 18, the hypervisor to re-assign a virtual machine address previously assigned to the minimum load dedicated queue to one or more shared queues.

24. The computer system of claim 18, wherein the load value placed by each of a plurality of virtual machine addresses on a corresponding dedicated queue of the virtual machine system is determined periodically at a selected time interval.

* * * * *